United States Patent [19]

Boyle et al.

[11] 3,858,232

[45] Dec. 31, 1974

[54] INFORMATION STORAGE DEVICES

[75] Inventors: Willard Sterling Boyle, Summit; George Elwood Smith, Murray Hill, both of N.J.

[73] Assignee: Bell Telephone Laboratories, Incorporated, Berkeley Heights, N.J.

[22] Filed: Nov. 9, 1971

[21] Appl. No.: 196,933

Related U.S. Application Data

[63] Continuation-in-part of Ser. No. 11,541, Feb. 16, 1970, abandoned.

[52] U.S. Cl. ...................... 357/24, 357/23, 307/304

[51] Int. Cl. ............................................ H01l 11/14

[58] Field of Search ...... 317/235 B, 235 G; 307/304

[56] References Cited

UNITED STATES PATENTS

| | | | |
|---|---|---|---|
| 3,462,657 | 8/1969 | Brown | 317/235 |
| 3,473,032 | 10/1969 | Lehovec | 317/235 |
| 3,479,572 | 10/1969 | Pokorny | 317/235 |
| 3,543,032 | 11/1970 | Kazan | 317/235 |
| 3,546,490 | 12/1970 | Sangster | 317/235 |
| 3,576,392 | 4/1971 | Hofstein | 317/235 |
| 3,591,836 | 7/1971 | Booher et al. | 317/235 |
| 3,621,283 | 11/1971 | Teer et al. | 317/235 |
| 3,623,026 | 11/1971 | Engeler et al. | 317/235 |
| R27,775 | 10/1973 | Lehovec | 317/235 |

FOREIGN PATENTS OR APPLICATIONS

| | | | |
|---|---|---|---|
| 6,805,705 | 10/1969 | Netherlands | 317/235 |

*Primary Examiner*—Martin H. Edlow
*Attorney, Agent, or Firm*—P. V. D. Wilde

[57] ABSTRACT

The specification describes devices based on the recognition that minority charge carriers within a semiconductor can be used to represent information. Storage sites are provided by potential wells formed along the semiconductor surface. The preferred structure is an array of metal electrodes on an insulating layer, each electrode comprising an MIS device. A quantum of charge carriers, representing an information bit, is generated within the semiconductor. This quantum can be translated along the semiconductor by successively biasing a row of electrodes. The potential well effectively "moves" through the semiconductor sweeping the minority carriers with it. The quantum can be detected by a simple capacitive couple, e.g., a floating gate FET.

32 Claims, 22 Drawing Figures

INVENTORS W. S. BOYLE
G. E. SMITH
BY [signature]
ATTORNEY

INFORMATION STORAGE DEVICES

CROSS REFERENCE TO RELATED APPLICATION

This application is a continuation-in-part of our copending application, Ser. No. 11,541, filed Feb. 16, 1970, now abandoned, by W. S. Boyle and G. E. Smith.

This invention relates to information storage devices known as charge coupled devices.

BACKGROUND OF THE INVENTION

There is a wide variety of electrical devices in which information storage is an essential feature. Memory and logic devices often rely on magnetic mechanisms in which the information is represented by the polarity of magnetic domains stored in a sheet, hollow core or wire.

In the usual form of the video camera an optical image is stored in the form of electrostatic charge on a monolithic storage layer. The localized charge density of the electrostatic pattern is then "read" with a scanning electron beam.

Information storage is also implicit in delay lines. These devices are typically acoustic or electromechanical with the information stored dynamically in a traveling elastic wave.

Electrical storage devices commonly comprise arrays of devices connected in logic patterns in which binary information is stored and processed by sequential switching of the devices.

STATEMENT OF THE INVENTION

The present invention involves an information storage mechanism that is unique and versatile. It offers many of the advantages of the several forms of storage devices mentioned above.

The invention is based largely on the recognition that electric charge can be stored in a spatially defined potential minimum within a semiconductor; that the storage site within the semiconductor can be selected; and, most importantly, that the storage site can be changed within the semiconductor in at least two dimensions. Thus electric charge, representing information, can be generated, translated and retrieved.

In a static sense, the sites used for storage according to the invention are well known. They are depletion layers that are capable of trapping and storing minority charge carriers. For the purpose of the description of this invention, these storage sites will be termed "potential wells." It is important to recognize that this embodiment of the charge coupled device concept relies on minority carriers exclusively to represent the information throughout the generation-transfer-detection operations.

Alternately, materials are available in which the free carrier concentration is very low and minority carrier lifetime is high so that storage of minority carriers can occur in potential wells within the medium that may not be considered by traditional standards to be depletion layers. In a sense, such materials are inherently fully depleted so that when a potential is applied there is no recognizable interface between regions of relatively high and low carrier concentration. Hence the explanation of the transfer mechanism in terms of depleted regions no longer vigorously applies. It is important to recognize that in such inherently depleted materials the charge being stored as information need not necessarily be minority charge as, by definition, in these materials the distinction between majority and minority carriers is not critical. Preferred materials that have these characteristics are $KTaO_3$ ZnO, ZnS and, CdS, and other II-VI compound semiconductors. These materials are normally classed as high resistivity semiconductors. The references in this specification to semiconductor storage media should be construed as encompassing these materials as well as other high resistivity materials that meet the foregoing criteria. A more complete discussion of the properties of storage media for charge coupled devices will be found in U.S. patent application Ser. No. 47,205, filed June 18, 1970 by D. Kahng.

The storage medium must also provide sufficient carrier mobility for charge carrier transfer. This consideration is especially important for high speed operation. With reference to silicon, the storage medium that is preferred at this stage of the development of charge coupled device technology, this requirement suggests that the storage medium be p-type for electron mobility in depleted p-type material can be approximately three times the hole mobility in depleted n-type material. However, other considerations may favor the use of n-type storage media. Another embodiment, in which charge is stored in an electrically depleted homogeneous storage layer is described in U.S. application Ser. No. 131,722, filed Apr. 6, 1971 by W. S. Boyle and G. E. Smith.

A potential well can be generated at a desired location in the semiconductor by locally biasing the semiconductor. This can be facilitated in a representative embodiment by forming an electric field pattern over the semiconductor surface. The pattern may be monolithic for certain forms of devices (to be described below) or may assume a specific geometry to perform a desired function, e.g., a logic function. In a preferred embodiment of the invention the devices comprise an MIS array and the depletion region is formed via the well-known field effect.

The potential wells can be charged initially by several methods. These will be treated in detail below along with detection or readout schemes. The translating function is achieved by moving the potential wells along the desired translation path. This has the effect of moving the charge accumulated in each well. Since mobile charge influenced by more than one potential well will accumulate in the deepest potential well, operation of some charge coupled device embodiments will focus on the deepest of more than one overlapping potential well.

DETAILED DESCRIPTION OF THE INVENTION

The following detailed description sets forth various embodiments of the invention, all of which share the basic information storage feature described above. In the drawing.

DETAILED DESCRIPTION

Figure 1A:
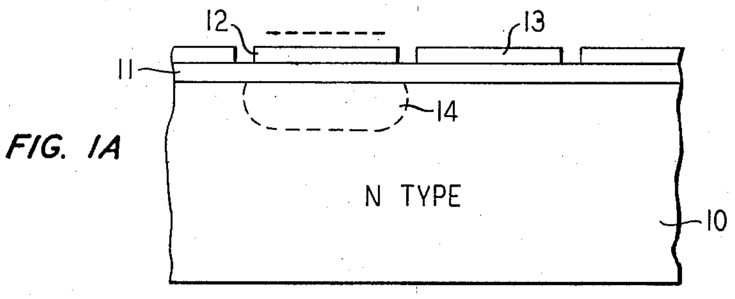
FIGS. 1A to 1D are schematic diagrams illustrating the charge translating mechanism that is a fundamental feature of the invention.
Figure 1B:
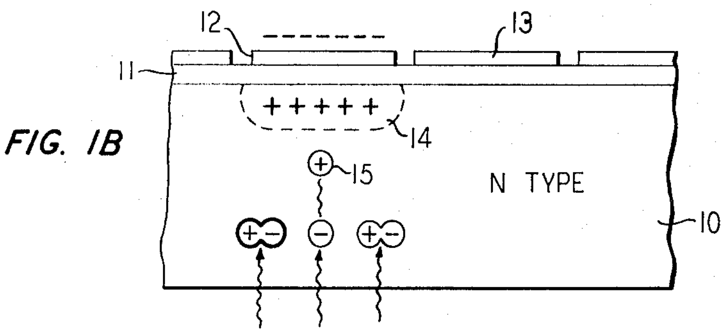
Figure 1C:
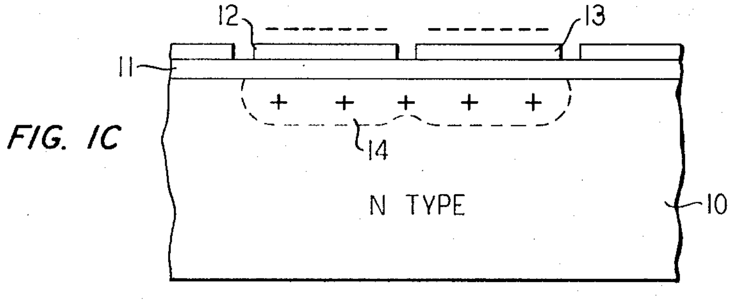
Figure 1D:
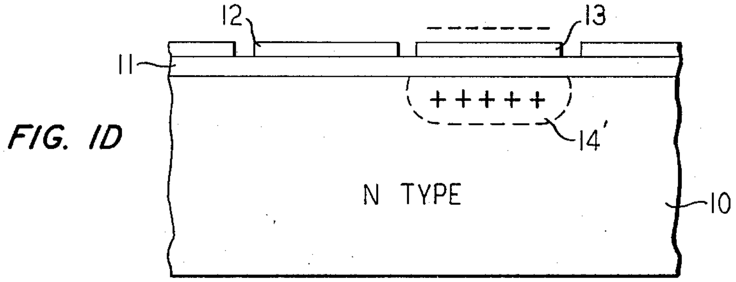

FIGS. 1A to 1D illustrate the charge transfer process according to one embodiment. The transfer mechanism of all embodiments herein is similar in concept. In FIG. 1A the semiconductor substrate 10 is covered with a thin insulating film 11 and two metal electrodes 12 and 13 which form part of an array. In FIG. 1A, electrode 12 is biased while electrode 13 is not. A depletion region or potential well 14 forms under electrode 12. In FIG. 1B, minority charges 15, created through, e.g., hole-electron pair generation from photon absorption, are shown migrating to the depletion region 14 and stored there. When electrode 13 is biased simultaneously with electrode 12, the depletion region extends continuously below both electrodes as shown in FIG. 1C. The charge redistributes across the enlarged layer. As the bias on electrode 12 is removed, as shown in FIG. 1D, the portion of the depletion region under electrode 12 collapses shifting all the charge to the potential well 14′ that is now associated with electrode 13. In a like manner the charge entity represented in FIG. 1D can be shifted stepwise to any location in the semiconductor. It will be recognized that the substrate 10 of FIGS. 1A to 1D can be p-type and the charges reversed in sign.

Figure 2:
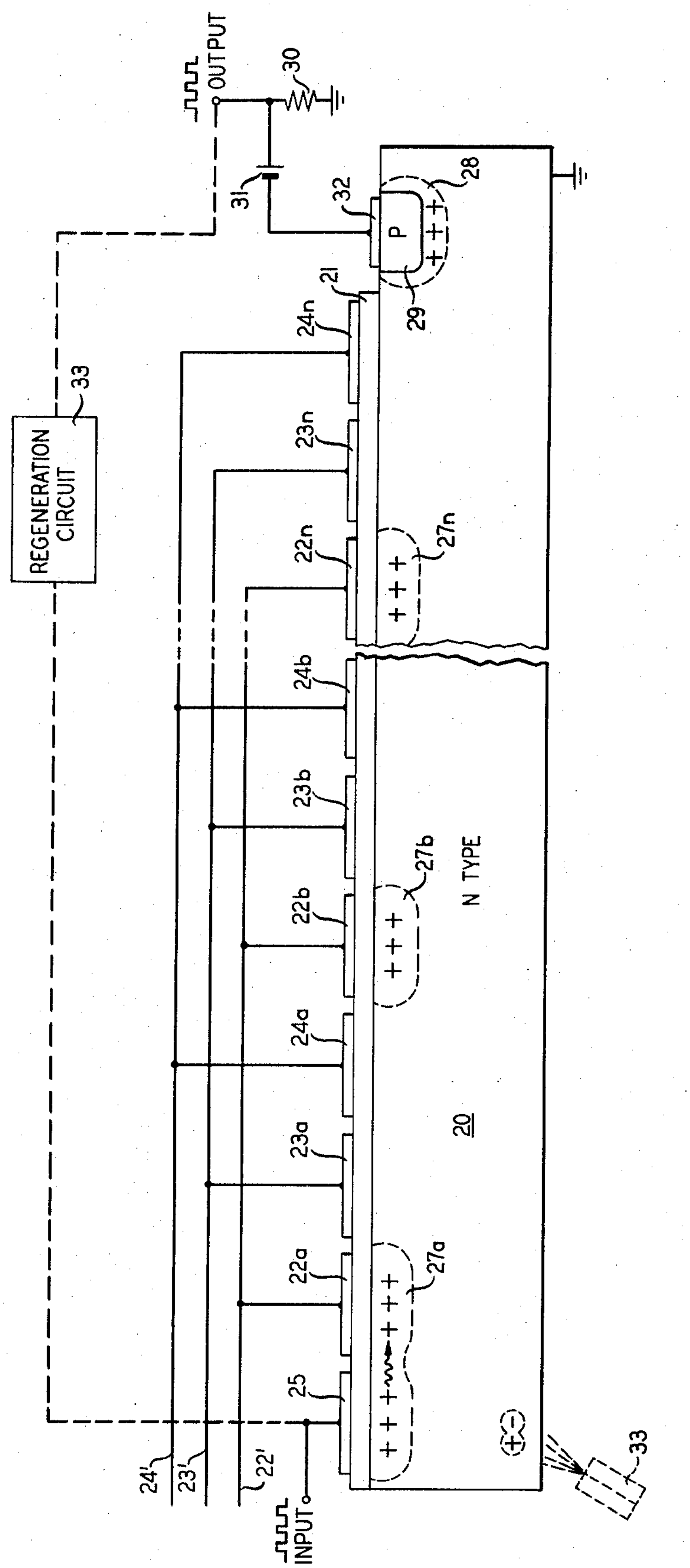
FIG. 2 is a front sectional view, partly schematic, of a shift register embodying the novel information storage feature.

The utilization of this translating mechanism is illustrated, according to one embodiment of the invention, in connection with the shift register of FIG. 2. This device is chosen for illustration because it is a fundamental structure from which many forms of logic and memory devices can be derived. The structure is similar to that of FIGS. 1A to 1D. A semiconductor substrate 20 is covered with dielectric layer 21 on which is formed a sequence of electrodes 22 to 24, in triplets designated *a* and *b* through *n* (as being part of a series terminating with 24*n*). Conductors designated 22′, 23′, and 24′ join each third electrode. In this embodiment the input or generating stage shown at 25 is an MIS device driven to avalanche condition. The charge generated at 25 migrates as shown to the potential well 27*a*. This figure illustrates the transmission of a sequential pulse train.

The shift register can be operated in a recirculating mode either for increasing the storage duration, or for regenerating the signal to overcome noise or charge losses, by simply connecting the output signal back to the input stage through an appropriate regeneration circuit 33.

In addition to providing necessary or desirable device functions for facilitating or improving the efficiency of the basic charge coupled device, recirculation and regeneration of charge, with or without inversion, can be important in connection with the performance of logic functions.

Charge regeneration can be performed generally as shown in FIG. 2. State inversion may be accomplished by adapting a threshold gating means such that the amount of charge transferred away from the generation means is the logical negative of the amount of charge detected at the detection site.

In one embodiment a pair of floating MIS-type electrodes are conductively connected together, one of them providing the sensing function and the other providing the gating function.

Alternatively an electrically floating localized semiconductive zone disposed within a charge coupled device provides the sensing function. The induced voltage on this floating zone is coupled to an associated MIS-type electrode which provides the gating function.

In both embodiments a reverse-biased rectifying barrier can be used as a collector for disposing of the charge carriers after detection. The fresh supply of charge can be provided in a variety of ways, one suitable way being to draw them from a localized semiconductive zone of the appropriate type semiconductivity or from a suitable injecting contact.

In other described embodiments logical "FAN-OUT" is accomplished by connecting one sensing means to each of a plurality of gating means which control the transfer of charge away from one or a plurality of generation means.

Logical NOR is provided by having a separate sensing means disposed in each of a plurality of separate charge transfer device channels of information and having the sensing means coupled separately to a corresponding plurality of gating means disposed serially with respect to an injecting means. The gating means are arranged so that charge is allowed to transfer away from the injecting means only if less than a predetermined amount of charge exists simultaneously at each of the sensed locations along the plurality of channels.

Logical NAND is provided by having a separate sensing means disposed in each of a plurality of separate charge transfer device channels of information and having the sensing means coupled separately to a corresponding plurality of gating means disposed in parallel with respect to an injecting means. The gating means are arranged so that charge is prevented from transferring away from the injecting means only if greater than a predetermined amount of charge exists simultaneously at each of the sensed locations along the plurality of channels.

A more detailed description of charge coupled devices having these functional capabilities can be found in U.S. Application Ser. No. 114,625 filed, Feb. 11, 1971 by G. E. Smith and M. F. Tompsett.

It should be appreciated that another important device application is implicit in the operation of the device of FIG. 2. That application is information or signal delay. Many forms of delay lines can make use of structures similar to that of FIG. 2. By sequentially biasing conductors 23', 24', and 22', the charge will shift into pocket **27*b*. In a like manner the charge is translated into pocket 27*n* and then into the depletion region 28 accompanying the p-n junction 29 of the output stage. A pulse output is then detected across load 30 as shown. A bias source 31 is connected to electrode 32** to bias the junction.

The output stage shown here utilizes a p-n junction to extract charge collected from the terminal stage **24*n***. A directly analogous detector which is equally effective is a Schottky barrier device. An appropriate Schottky device is described in the Bell System Technical Journal, Vol. XLIV, No. 7, Sept. 1965 at pp. 1525–1528. For purposes of definition, the aforementioned charge detecting devices can be characterized by the term "barrier layer."

Figure 3:
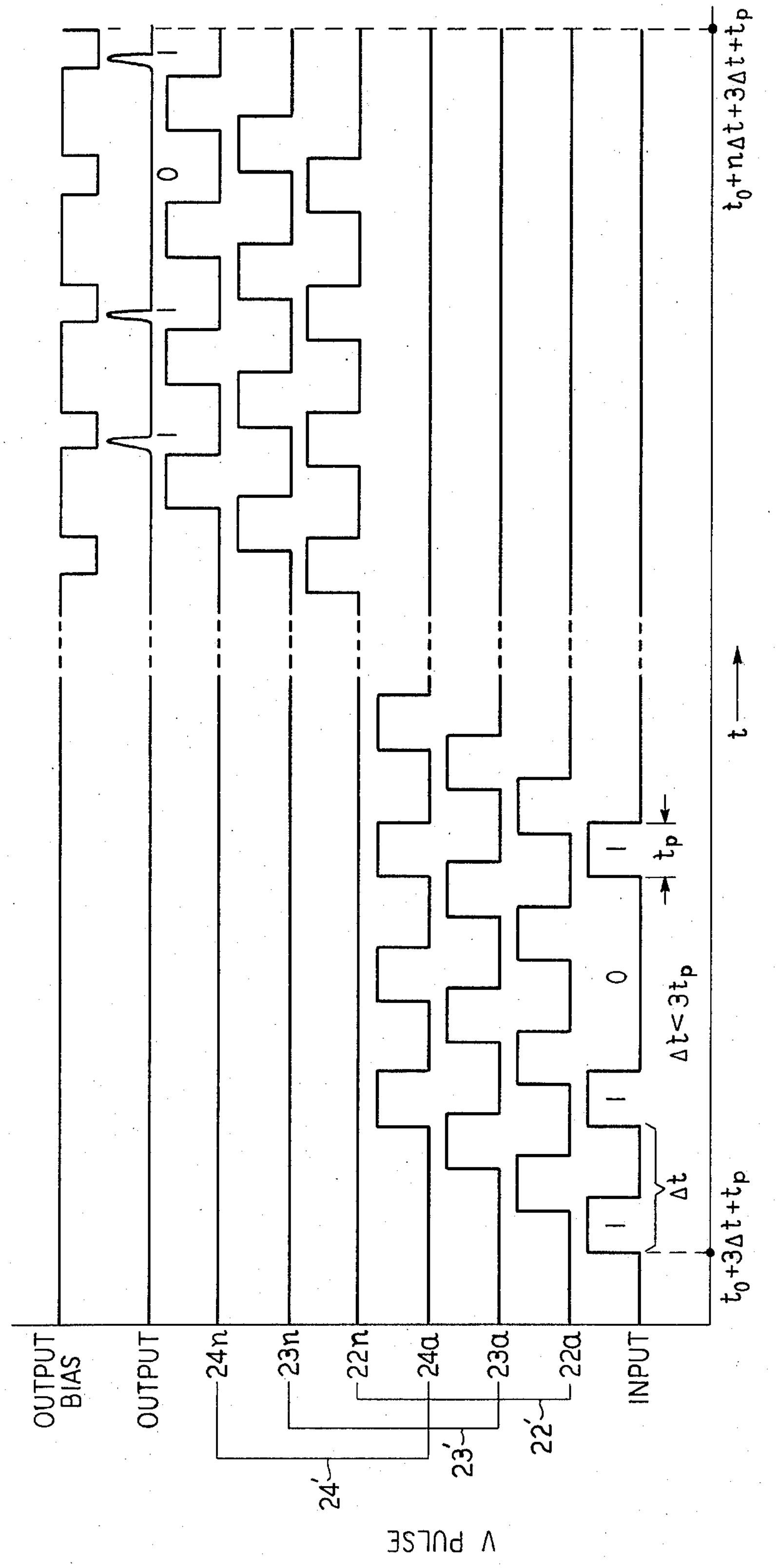
FIG. 3 is a pulse program for the shift register of FIG. 2.

An exemplary pulse program for the shift register of FIG. 2 is shown in FIG. 3 (The ordinate is not to scale.). This diagram illustrates transmission of the binary code 1101. While it is not evident from this abbreviated representation, it is clear from FIG. 2 that each element **22*a* through 22*n* is simultaneously pulsed via conductor 22', likewise for conductors 23' and 24'**. The pulses on each element are timed such that the time period between the initiation of sequential pulses, $\Delta t$, is less than three times the pulse width, $t_p$. This ensures that the pulse on each sequential stage overlaps both the former and the subsequent stage. Otherwise one potential well may collapse before the next one is accessible to the charge.

Referring back to FIG. 1C, it will be appreciated that the charge transfer time for that portion of charge situated under electrode 12 will be equal to the fall time of the pulse in FIG. 3. Experimental evidence indicates that the transfer time under the conditions outlined is quite fast. However, if the pulse program of FIG. 3 is comparably fast, it may be advantageous to use a pulse shape that gives a longer fall time. A convenient pulse form serving this function is a sine wave.

A preferred modification of the charge translating mechanism of this invention makes use of a continuous uniform bias on all conductors so as to maintain at least a shallow depletion layer over the entire surface of the device. This bias should be at least equal to the threshold voltage for producing inversion under steady state conditions. In this way the troublesome surface states, which are inevitably present at semiconductor-insulator interfaces (and which cause adverse surface recombination), can be maintained relatively free of majority carriers. That is, by isolating the bulk of the majority carriers from the interface via a space-charge layer, the carriers in the surface states, having once recombined with minority carriers, cannot then be replenished. This technique, which simply requires a prebias on every metal contact, insures a long lifetime for the minority carriers constituting the signal. In a device having many stages this expedient may be essential.

Figure 4:
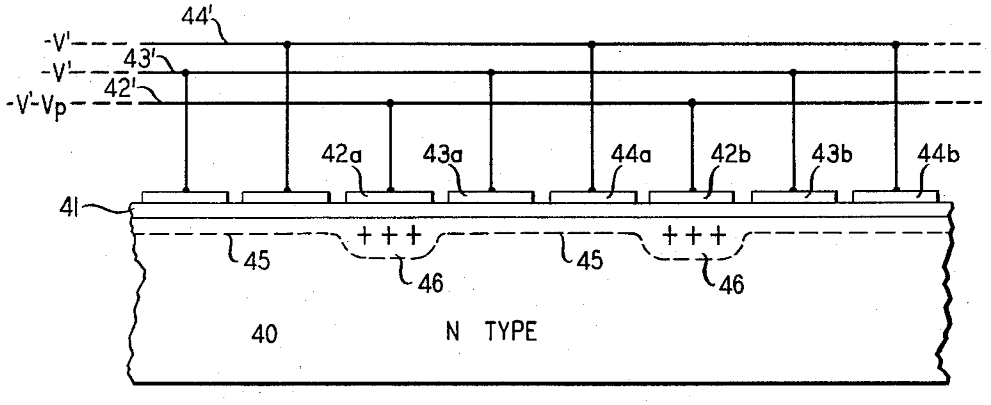
FIG. 4 is a front sectional view partly schematic illustrating a preferred method of charge translation.

The modification just described is illustrated in FIG. 4. The device corresponds to a middle portion of the shift register of FIG. 3. The semiconductor base layer 40, which again is n-type, the insulating layer 41, and metal contacts **42*a*, 43*a*, 44*a*, 42*b*, 43*b*, and 44*b* and the associated conductors 42', 43', and 44' correspond to similar elements in FIG. 3. The essential distinction is the presence of a continuous bias voltage V' on all conductors to form a uniform depletion region 45 over the entire device. Potential wells 46 are formed under contacts 42*a* and 42*b*** as the result of the pulse voltage $V_p$ superimposed on the bias voltage V'. An alternative way of isolating the charge carriers from the adverse effects of surface states is to store and transfer the charge within the bulk of the storage layer and electrically isolated from the surface. One means of achieving this object is to provide a barrier layer along both major boundaries of the storage layer so that stored charge is confined to the bulk of the semiconductor. When the isolated storage layer is biased with respect to the boundary layers a potential minimum (for stored charge) exists within the bulk of the storage layer. Charge tends to be confined to the interior region of the storage layer.

Figure 5:
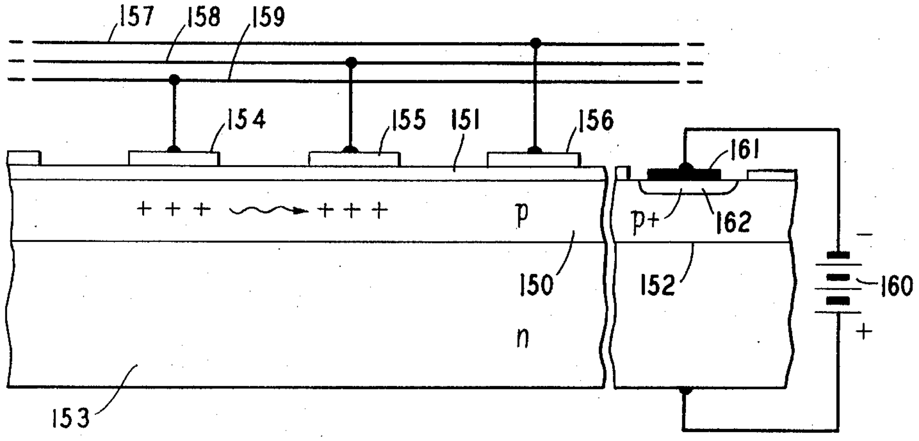
FIG. 5 is a sectional view of a buried channel charge coupled device.

One embodiment of the buried storage layer charge coupled device concept is shown in FIG. 5. In this exemplary configuration the storage layer 150, which here is shown as p-type semiconductor, and in a preferred embodiment is silicon with a normal resistivity (0.1 to 100 ohm cm), is bounded on the surface with the usual insulating layer 151 and is further isolated at its lower boundary by p-n junction 152, formed in any appropriate and including n-layer 153. The device shown has control electrodes 154, 155 and 156 connected to a three wire drive comprising wires 157, 158, and 159 (illustrated schematically). Bias means 160 is shown schematically and is intended to bias, via electrode 161, the storage layer with respect to n-layer 153 so that the free carriers in the storage layer are largely removed. Electrode 161 may comprise a Schottky contact or a p+ region 162 may be provided to allow ohmic contact. The device is then in condition for normal charge coupled operation except that the information carriers will now be stored and transferred in the bulk of the storage layer as indicated schematically in the Figure. Further details of buried channel charge coupled devices are contained in U.S. Pat. application, Ser. No. 131,722, filed, Apr. 6, 1971 by W. S. Boyle and G. E. Smith and Ser. No. 131,721, filed Apr. 6, 1971 by R. H. Krambeck.

Input Stage

The shift register of FIG. 2 is described as having an avalanche device for creating charge at the input location 25. There are several alternative methods for creating minority charge carriers. For example, if the input stage comprises a p-n junction, minority charge carriers can be injected into the bulk region of the semiconductor by forward bias pulses corresponding to the desired input signal.

The junction current can be modulated with information or, alternativey, the p-n junction can be biased continuously to provide an infinite source of minority carriers and the desired carriers can be gated into the charge transfer line through a channel formed adjacent an MIS gate as in the well-known field effect device. These approaches are essentially equivalent in principle since the first transfer stage can be compared to the gating device except that the information signal is applied to the junction in the first case and to the gate electrode in the second.

Figure 6:
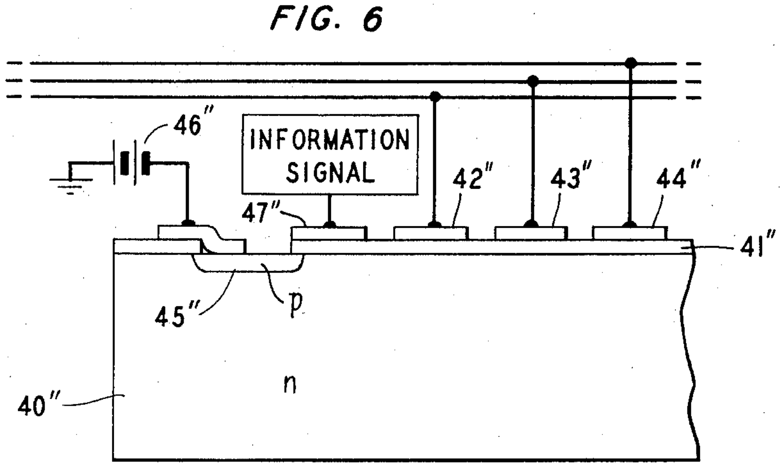
FIG. 6 is a front sectional view, partly schematic, illustrating a preferred arrangement for introducing charge into a charge coupled device.

A gated input stage in accordance with the description above is shown in FIG. 6. The storage medium 40'' is shown with insulating layer 41'' and three transfer electrodes 42'', 43'', and 44'' as in the device of FIG. 4. The input stage comprises p-n junction 45'' continuously biased via source 46''. The information signal is gated with electrode 47'' as shown. The information signal is clocked with the first transfer electrode 42''.

Alternatively carriers can be injected by MIS surface avalanching as described in *Journal of Applied Physics*, Vol. 9, No. 12, p. 444. A hybrid structure employing a metal-oxide surface contact on a p-n junction is effective for the same purpose. Another alternative is to generate hole-electron pairs by photon absorption or absorption of other ionizing radiation. This is treated fully in U.S. Pat. No. 3,523,208, issued Aug. 4, 1970 to E. I. Gordon-F. J. Morris. The minority charge carriers will diffuse to nearby depletion region which in the case of the shift register of FIG. 2 is the first stage 27*a*. A means for achieving this is shown in phantom at 34 in FIG. 2. the element 34 is a light source — in this case, a schematic representation of an electroluminescent diode. This mechanism for minority carrier generation is quite useful in imaging devices based upon the principles of the invention. These will be described in more detail below.

Output Stage

Figure 7A:
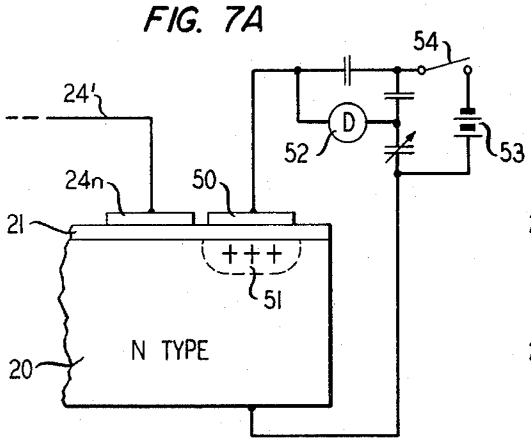
FIGS. 7A, 7B and 7C are largely schematic representations of means for detecting the presence or absence of charge in the terminal translating stage.
Figure 7B:
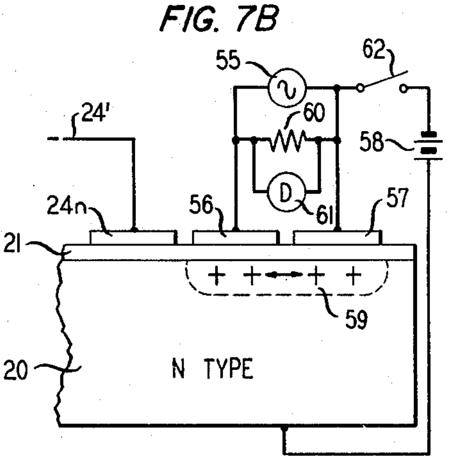
Figure 7C:
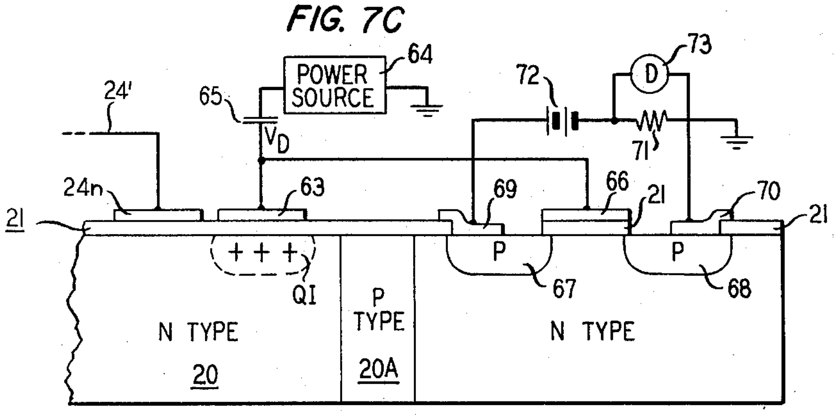

The output stage can also assume a variety of forms. FIGS. 7A to 7C illustrate a few alternative embodiments. These figures show the terminal section of the device of FIG. 2 including the last transfer stage 24*n*. Each of these devices are charge detection devices constructed according to known principles. In FIG. 7A the detector is an MIS device and is therefore especially convenient, from a processing standpoint, where an MIS array comprises the transfer stages. With the semiconductor depleted, the capacitance associated with detector electrode 50 will indicate the presence or absence of externally introduced charge in the depleted region 51. The capacity across the MIS detector is measured by a standard capacitive bridge as shown and the value indicated at detector 52. The bias source 53 is arranged via switch 54 to intermittently bias that portion of the semiconductor below electrode 50 first to establish the depletion region for attracting the charge to be detected and then to collapse the depleted region to recombine the charge which may have accumulated.

In the detection stage of FIG. 7B an alternating current source 55 is connected to two adjacent field plates 56 and 57, the latter again comprising MIS devices with semiconductor 20 and insulating layer 21. A bias source 58 maintains a depletion region 59 beneath both electrodes 56 and 57. If charge is present in the terminal transfer stage 24*n* it is transferred to the potential well accompanying plate 56 on its negative half cycle and then toward the well of electrode 57 on the latter's negative half cycle. This transfer of charge back and forth beneath electrodes 56 and 57 changes the a.c. impedance of the circuit from its value without charge in the depletion layer. The presence or absence of charge is thus detectable across impedance 60 by potentiometer 61. The switch 62 functions to erase the charge in the manner of switch 54 of FIG. 7A. The speed of the erase function can be enhanced by providing a switching network to reverse the d.c. bias rather than merely removing the bias.

The detection stage of FIG. 7C relies on a direct voltage measurement to detect interface charge $Q_I$ accumulated between semiconductor 20 and insulator 21. The electrode 63 is biased negatively via source 64 connected in series with a blocking capacitance which is shown in the figure as a capacitor, 65, but may alternatively be a diode. A change in the charge level $Q_I$ is reflected by a change in the equivalent capacitance of the MIS device. This affects the capacitive division between that element and the capacitor 65 resulting in a change in $V_D$. The voltage $V_D$ can be measured in various ways, e.g., at the gate of a field-effect transistor. Shown in FIG. 7C is a field-effect device integrated with the semiconductor base 20 of the storage device. A p-region 20A is shown representing isolation according to known integrated circuit techniques. The voltage $V_D$ being measured is connected to the gate electrode 66. The insulating layer for the gate is shown as an extension of insulating layer 21. Source and drain regions 67 and 68 are diffused through windows formed in this layer. Source and drain electrodes 69 and 70 are connected through load 71 to bias source 72. Detector 73 indicates the conduction state of the FET which reveals the presence or absence of charge $Q_I$ in the following manner.

A positive pulse delivered by power source 64 recombines any residual charge $Q_I$ and primes the device for detection. A negative pulse places negative charge on plate 63 and depletes the region under that electrode for collecting holes delivered (or not delivered) from terminal stage 24*n*. The gate 66 is biased at the same potential leaving the FET in an "ON" condition indicated at 73. If charge $Q_I$ enters the region below plate 63, the negative potential on the plate will be reduced. The corresponding reduction in potential at the gate electrode 66 will place the FET in an "OFF" condition. If there is no charge $Q_I$ the FET remains "ON."

The device of FIG. 7C is shown partly integrated. The FET device can be used separately or the device can be further integrated, e.g., the elements 65, 71 and the electrical connections can be integrated.

The device geometries described so far have all their active elements disposed on one surface of the storage medium and all charge translation occurs in one dimension. Charge translation in two dimensions is straightforward. For example, the charge coupled line of FIG. 2 can be serpentined in two dimensions or can assume other *x-y* configurations specifically designed for various logic functions. This concept can be extended along the lines suggested by the magnetic domain wall or "bubble" information storage technology.

The design of charge coupled devices can be extended yet further into a three-dimension regime to give a new dimension of design freedom that heretofore has not been utilized commercially in devices of this kind. With the appropriate application of electric fields, charge can be made to transfer selectively through the thickness of the storage medium. The storage medium is still envisioned as a relatively thin wafer in which the influence of electric fields applied at the surface can extend far enough along the thickness dimension that uncontrolled lateral movement of the charge does not occur. It then becomes possible to utilize both major faces of the storage medium.

It can be inferred from the two-dimensional discussion above that stepping of the charge at any reasonable angle, usually 90°, in the plane of the storage medium is straightforward. Likewise the movement of charge in any of three orthogonal dimensions can be achieved in the same manner. It is necessary in each case only that the potential wells from the transferring and receiving sites overlap, or so nearly overlap that carriers will diffuse to the receiving site and be captured in adequate amounts to achieve the objective desired. In some cases the latter requirement is quite lenient. For example, we known that in the case of minority carrier generation due to photon absorption near one surface of a silicon wafer 25 mils in thickness, the carriers can be captured in adequate numbers by space charge regions attending biasing means applied to the opposite side of the wafer.

Figure 8:
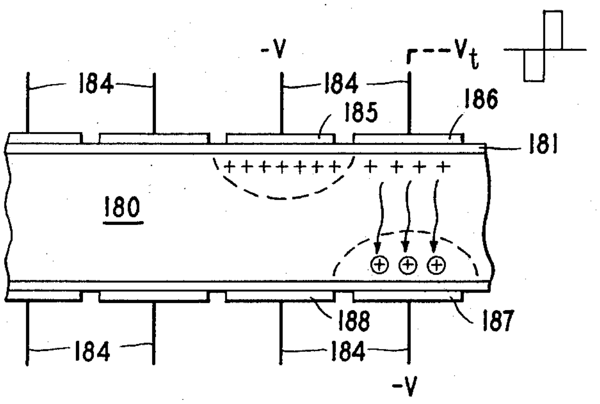
FIG. 8 is a sectional view showing, schematically, the transfer of stored charge between storage sites on opposite sides of a storage medium.

Transfer of charge through the thickness dimension of the storage medium is illustrated in FIG. 8. The device shown has a basic structure similar to that of FIG. 2 except that transfer electrodes 184 are formed on both sides of the storage medium 180. Transfer of charge through the slice will be described as occurring sequentially between the storage sites associated with electrodes 185, 186, and 187. Electrode 186 is initially biased negatively (assuming an n-type storage medium), in sequence to the normal three-phase transfer bias on electrode 185, to transfer charge to its storage region. After a half-cycle of negative bias the voltage is made more positive, or sufficient to inject the stored carriers into the bulk of medium 180. The transfer bias is shown by the schematic waveform designated $V_t$. The positive portion of the cycle may be greater or smaller as desired and the duration may require adjustment to fit individual applications. Electrode 187 is biased with the normal transfer bias, −V, in sequence. Charge will be trapped temporarily in the depletion region adjacent electrode 187 until transferred in the normal sequence to the storage site adjacent electrode 188.

Charge Translation Enhancement

The charge translating mechanism described in connection with FIG. 1 relies in part on thermal diffusion to transport carriers from potential well 14 to potential well 14'. While this transport mechanism is adequate, the response time of devices using this mechanism can be significantly reduced by using an electric field to drive the charge to the new location. In many cases the use of the drive field will improve the collection efficiency also. One means of achieving this is to shape the potential well so that a field gradient exists between adjacent wells. This scheme, which for the purpose of this description will be termed "field enhancement," is shown in two illustrative embodiments in FIGS. 9A and 9B.

Figure 9A:
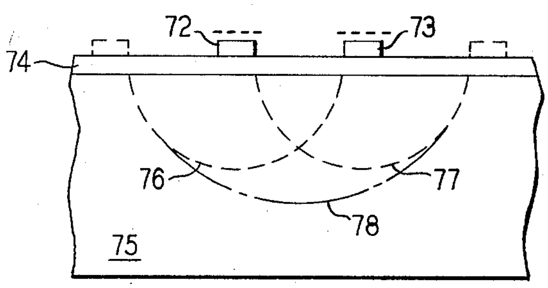
FIGS. 9A and 9B are schematic representations of preferred techniques for enhancing charge translation.

FIG. 9A shows two conductors 72 and 73 situated on insulating layer 74 which in turn covers semiconductor substrate 75. With the conductors 72 and 73 biased, their respective depletion layers appear to have shapes indicated by dashed lines 76 and 77. These lines, which represent the boundaries of the depleted region of the semiconductor also are a function of the field potential at the semiconductor-insulator interface. Thus it is convenient in this discussion to consider these boundary lines as potential profiles along the surface of the semiconductor where the charge is stored. As a consequence of making the size of the electrode comparable to, or less than, the thickness of the insulator, the field approaches the situation where it appears to emanate as if from a point rather than a plate (as in FIG. 1) and produces a continuous field gradient along the surface. This field gradient is aptly described as a potential well and tends to confine the charge at its center. When these wells are made to overlap (a condition implicit from the previous discussion, e.g., the pulse program of FIG. 3) the composite field profile is described by the dotted line 78 of FIG. 9A. Now it is intuitively obvious that the charges will transport from the region directly under electrode 72 toward electrode 73. After the depletion field represented by line 76 collapses, the charges will be swept to the surface region of highest potential in the well represented by line 77, or directly under electrode 73.

Referring back to the buried channel device described in connection with FIG. 5 it will be evident that one consequence of storing the charge in the interior of the storage layer is that charge is further removed from the field plates than it is in the surface storage mode. From the point of view of the field potential lines this is roughly equivalent to making the insulating layer thick with respect to the size of the field plates and reduces the electrode spacing requirements that occur with devices operating in the surface storage mode.

Figure 9B:
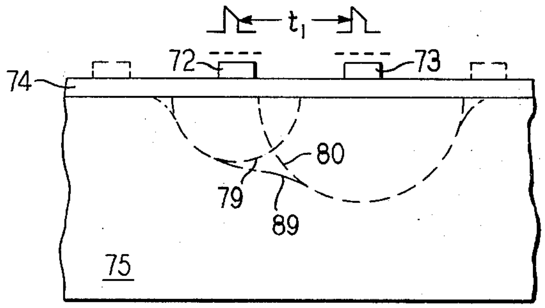

Field enhancement can be made more effective by using a shaped pulse as described by FIG. 9B. For example, if a saw-tooth pulse is applied to electrodes 72 and 73, then at a time $t_1$ during the period of pulse overlap (the charge translating period), electrode 72 will be biased at a lower voltage than electrode 73. This is indicated schematically by the arrows adjacent the respective pulse forms. The separate field profiles at $t_1$ are described by dashed lines 79 and 80 with the composite profile appearing as dotted line 89. The field gradient in the direction of desired charge translation extends instantaneously all the way to the region immediately below electrode 73.

The schemes just described are but two of many possibilities for producing a field gradient or drive field for the charge (or absence of charge) accumulated at the initial storage location. All those arrangements which produce field enhancement of charge translation are intended to be within the scope of this embodiment of the invention.

A closely related consideration and one which is more basic to the operation of charge coupled devices is the mechanism whereby the directionality of charge transfer is obtained. Two symmetrical drive electrodes with alternate equivalent voltages applied will cause the charge to go back and forth under the two electrodes, as occurs in the detector of FIG. 7B. When the third drive phase is added, as in FIG. 2, the drive field becomes asymmetrical (as long as the three phases are biased in a 1-2-3-1 rather than a 1-2-3-2-sequence). The asymmetry is a necessary condition for controlled directional transfer.

There are various ways of obtaining asymmetry in the drive field. For example, the field profile under a given field plate can be made asymmetrical by using a dual thickness insulating layer, the thinner portion being disposed on the forward side with respect to the direction of charge transfer. This is explained in detail in U.S.

Pat. application Ser. No. 11,448, filed Feb. 16, 1970 by D. Kahng and E. H. Nicollian. It will be apparent that by using this expedient the number of essential drive phases reduces from three to two. Whenever the asymmetry is incorporated into the semiconductor or the insulator, the electrode pattern and bias sequence can be symmetrical. This usually implies two phase clocking for charge transfer. This is important because it eliminates the necessity for the crossovers that are necessary in the three phase drive devices. It is possible to provide asymmetry in the drive electrodes themselves by using electrode materials with different work functions or by shaping the electrodes.

Asymmetry in the drive field can also be supplied by appropriate potentials applied to the drive electrodes in a manner resembling the field enhanced transfer described above.

An alternative structure known in the art for obtaining an assymetric potential to impart directionality to the charge transfer is described and claimed in U.S. application, Ser. No. 85,026, filed Oct. 29, 1970, by G. E. Smith and R. J. Strain. This structure can be driven with either two or four phases and comprises a sequence including a first level of electrodes insulated from and partially overlapping the first level electrodes.

An alternative technique for creating an asymmetrical drive field is to vary the doping density along the surface region of the storage medium. With a bias applied, the surface potential will vary with variations in the doping density. The charge carriers being stored and transferred will ordinarily seek a state of lowest potential energy, i.e., where the surface potential of opposite charge is greatest. Thus even though the potential on a given field plate is ordinarily spatially uniform the surface potential below that field plate can be made nonuniform so as to allow the flow of charge carriers only in one lateral direction. This concept, and several structures based on it, are described and claimed in U.S. Pat. application Ser. No. 157,509, filed June 28, 1971 by R. H. Krambeck, et al. Similar results from the viewpoint of obtaining asymmetry in the drive field can be obtained if the charge placed along the transfer path is graded. However the additional advantage of field enhancement results from graded charge if the gradation extends along a significant portion of the storage site. Device embodiments based upon this concept are described and claimed in U.S. Pat. application Ser. No. 157,507, filed June 28, 1971 by G. F. Amelio-R. H. Krambeck-K. A. Pickar. Similar effects can be produced by introducing charge into the insulating layer overlying the storage sites.

Fixed charge can also be used to advantage to obtain increased transfer efficiency and to reduce the number of active transfer electrodes. The former expedient recognizes the advantage in having a uniform or increasing surface potential across the interelectrode gaps. This eliminates the potential barrier that exists normally due to the finite interelectrode spacing. If the surface potential is tailored to provide this result then the size of the interelectrode gaps is no longer critical. The appropriate charge concentration to achieve these results is described in U.S. Pat. application Ser. No. 157,508, filed June 28, 1971 by G. F. Amelio and R. H. Krambeck.

The use of localized fixed charge to replace an active drive electrode is described and claimed in U.S. Pat. application Ser. No. 157,510, filed June 28, 1971 by R. H. Krambeck and C. H. Sequin. This device modification recognizes that a region of localized charge in the storage medium will have the same influence on carriers within the storage medium as a conventional drive electrode with a fixed bias. If a storage site adjacent to the fixed charge region has a lower surface potential then the site with the fixed charge region will attract carriers. To effect charge transfer the surface potential at the sites adjacent to the fixed charge site can be adjusted alternately between values above and below the surface potential at the fixed charge site. An advantage of this structure is that charge transfer can be made reversible. Related embodiments are described and claimed in U.S. Pat. application Ser. No. 157,507, filed June 28, 1971 by G. F. Amelio, R. H. Krambeck and K. A. Pickar. In one of these the substitution of fixed charge for an active drive electrode in a two-phase device yields a device in which only one varying potential is necessary to effect charge transfer.

Fixed charge can also be used to vary the storage potential at selected sites in accordance with a digital or analog code. Charge is then allowed to accumulate at each site to the predetermined capacity. Shifting out this charge yields a coded signal. Read-only memories in which the charge storage capacity of the storage sites are selectively adjusted either permanently or semipermanently are described and claimed in U.S. Pat. application Ser. No. 49,462, filed June 24, 1970 by G. E. Smith now U.S. Pat. No. 3,654,499, issued Apr. 4, 1972. Several other mechanisms for adjusting the charge storage capacity are given.

A device constructed without external connections and according to this driven with an electric field applied externally of the device is described in U.S. application Ser. No. 128,999, filed Mar. 29, 1971 by G. E. Smith. A charge coupled device with a two-phase drive arrangement is placed between a large parallel plate capacitor. With only every other drive electrode biased, the depletion region under the remaining electrodes can be controlled by capacitive coupling to the external capacitor.

Figure 10:
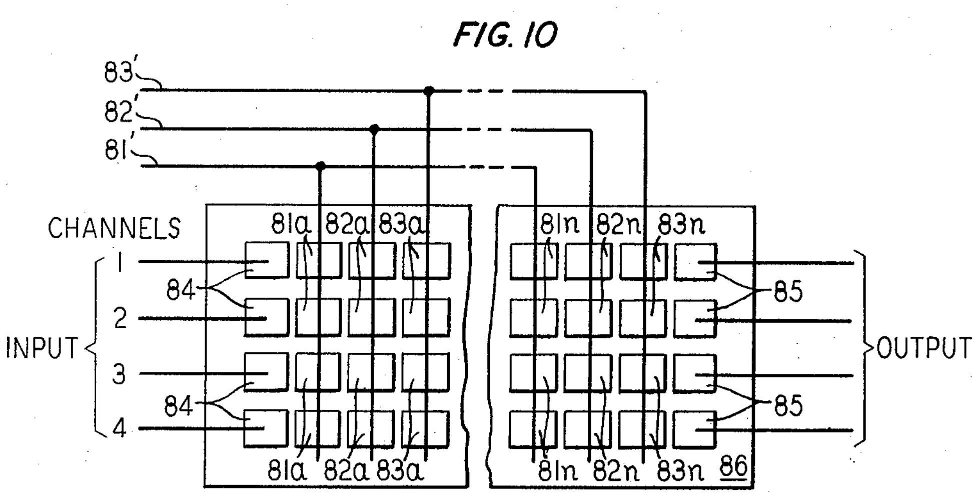
FIG. 10 is a plan view of a multichannel shift register, an extension of the device of FIG. 2.

The one dimension shift register shown in FIG. 2 can advantageously be incorporated in a multichannel register as shown in FIG. 10. It is evident that the linear array of FIG. 2 requires at least *n* crossovers (the figure shows 3*n*-3 crossovers but a straightforward modification reduces this number to *n*). Crossovers are used more economically in the arrangement of FIG. 10 wherein the same number of crossovers may provide a large number of channels. FIG. 10 shows four channels but this number can be extended without adding additional crossover connections. The conductor arrangement of conductors 81′, 82′, and 83′ is the same as that in FIG. 2 with conductor 81′ connected to contacts 81*a* through 81*n* in sheet 86 and likewise with conductors 82′, 83′ and electrodes 82*a* to 82*n* and 83*a* to *n*. Input stages 84 and output stages 85 have been discussed previously.

Figure 11:
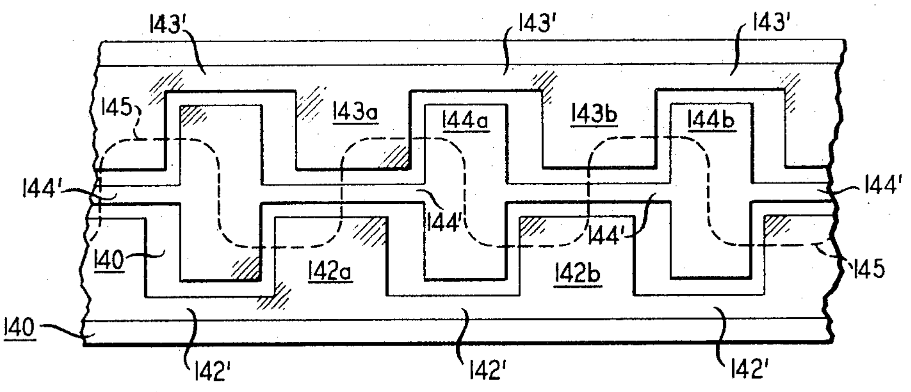
FIG. 11 is a plan view of a preferred conductor arrangement designed to avoid crossovers in the three-conductor storage control circuit.

Another embodiment which is advantageous from the point of view of minimizing crossovers is illustrated by the electrode configuration of FIG. 11. Shown there is a portion of a device which may, for example, be a plan view of a device similar to that of FIG. 4 and in which the conductors are so arranged as to avoid the necessity of crossover connections. Using numbers preceded by "1" to indicate elements corresponding with those of FIG. 4, the three conductors 142′, 143′ and 144′ are deposited directly upon a raised portion of the insulating layer 140 and interconnect electrodes 142a, 142b, 143a, 143b, and 144a, 144b, respectively. The path followed by the charge as it is stepped through this section is indicated by the dashed line 145. In this connection it should be appreciated that the charge is being translated under conductor wires and thus forms a convenient "crossunder" arrangement.

Figure 12:
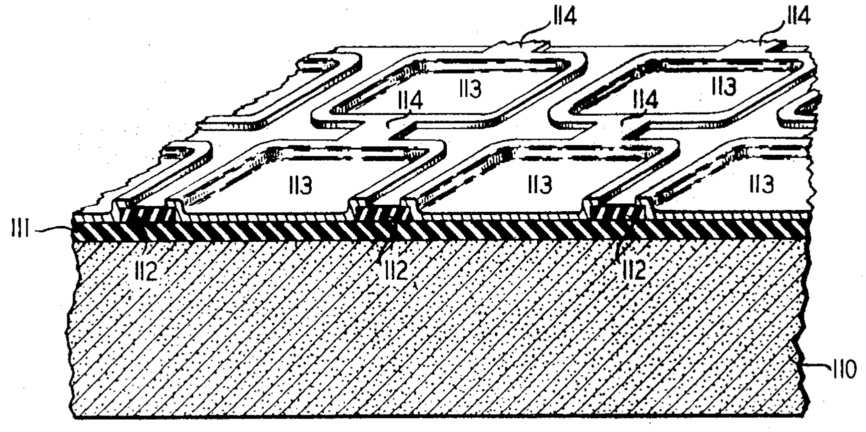
FIG. 12 is a perspective view of a portion of a charge translating device illustrating a preferred electrical contact arrangement.

Other arrangements similar in concept to that of FIG. 11 will occur to those skilled in the art. These can be described broadly as electrode configurations having a plurality of electrodes in which every third electrode is connected to one of three conductors and is adjacent to two electrodes, each of which is connected to a separate conductor of the remaining two, with all of the conductors and electrodes deposited on a single substrate surface. The disposition of the conductors along the sruface of the device can be an important consideration. In a large array it is impractical to bond each lead to its associated electrode. Consequently the charge transfer circuit would ordinarily be printed directly on the insulator covering the substrate. However, the effectiveness of the invention often relies on careful control of the field profile at the semiconductor insulator interface. If the conductors are in direct contact with the insulator, the field from each lead will perturb the desired field profile. To overcome this a dual thickness oxide can be formed over the semiconductor. Such an arrangement is shown in perspective in FIG. 12. The semiconductor substrate 110 is first coated with a thin insulating layer 111. Next a thick layer of another insulating material is formed on layer 111 and etched to form a grid 112 with openings for the metal field plates 113. The field plates can be deposited along with interconnections 114 using a single photolithographic step. Some overlap is shown in the figure to insure complete covering of the site. The conductor paths 114 to the electrodes 113 are isolated from the substrate by the thick insulator 112. The dual thickness insulating layer is conveniently made by selecting two different insulating materials, such as $SiO_2$ and $Si_3N_4$ that have different etching characteristics. Thus when the second layer is etched to form windows for the electrodes an etch can be selected which does not attack the first insulating layer. An alternate procedure known in the art for forming a dual thickness layer is to deposit a continuous first layer, etch the windows, and deposit another uniform layer.

Figure 13:
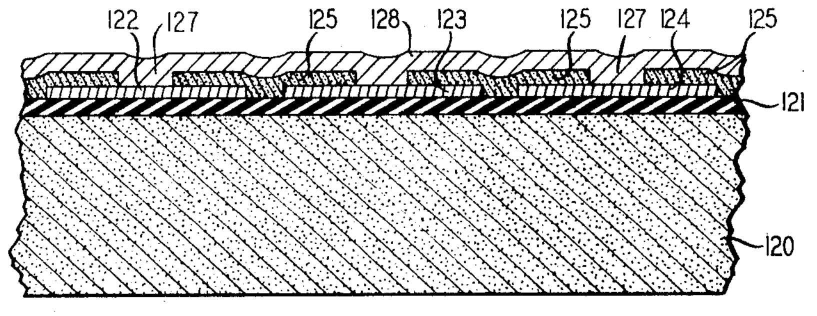
FIG. 13 is a front sectional view of a charge translating device showing an alternative electrical contact arrangement.

An especially convenient fabricating technique is illustrated in FIG. 13. This is a front sectional view of a portion of a planar processed device. The semiconductor substrate 120 is again covered with a suitable thin insulating layer 121. A continuous metal layer is deposited on layer 121 and etched to form discrete metal electrodes 122–124. A continuous insulating layer 125 is then deposited over the electrodes 122–124. Windows 127 are etched in layer 125 to the underlying metal. A ribbon or beam lead conductor 128 is then deposited so as to contact electrodes 122–124. The procedure has a distinct advantage in that it is devoid of any critical photoresist alignment steps.

Figure 14:
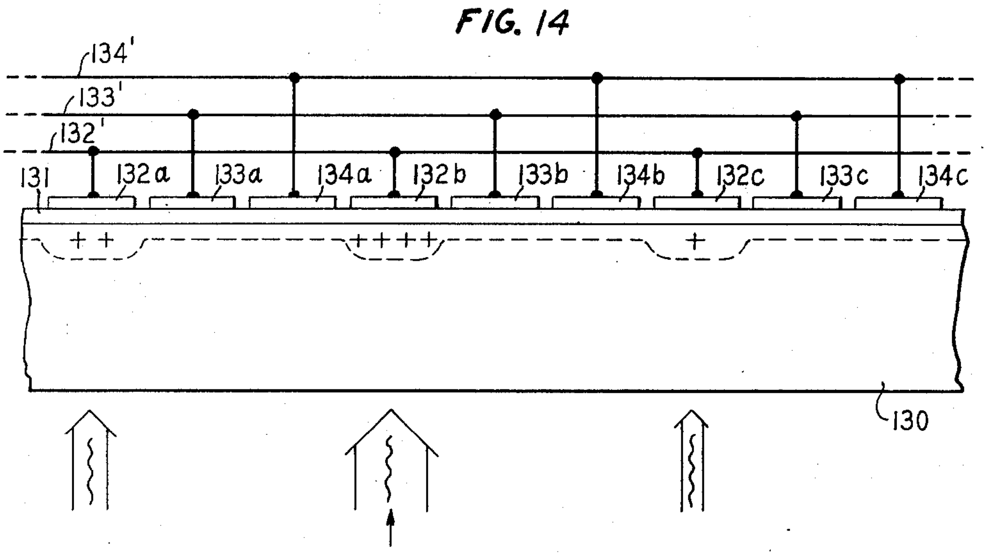
FIG. 14 is a front section, largely schematic, of an image detection device employing features of the invention.

The capability of producing minority charge carriers in the semiconductor by photon absorption, as mentioned previously, and as treated fully in U.S. Pat. No. 3,403,284, issued Sept. 24, 1968 to Buck, et al., introduces another category of devices which make use of the information storage and charge translation mechanism of this invention. One form of this device is a video camera, an embodiment of which is illustrated schematically in FIG. 14. The essential characteristic of this class of device is parallel read-in of information. Light in the form of the optical image being recorded is incident on the side of the semiconductor 130 opposite to the storage control elements. The latter again comprise metal-insualtor-semiconductor devices as in FIG. 2. It bears repeating that these elements can be constructed according to any suitable embodiment described herein and may comprise other types of depletion layer devices such as transistor-type structures. The array shown contains three bit locations comprising three electrodes designed 132a to 134a, 132b to 134b, and 132c to 134c connected to conductors 132′, 133′, and 134′ in a manner similar to the arrangement of FIG. 2. Except for the parallel read-in feature, the charge translation and readout operation can follow the teachings described above. The linear array shown in FIG. 11 may represent one raster line in a video system. The charge is stored at locations 132a–132c during the optical integration period. It is read out serially by translating the charge to the readout section (refer to FIG. 2). By sequentially reading each raster line, the video frame is constructed. One problem associated with sensing optical images with a charge coupled line or *x-y* array is that the charge transfer time during readout is finite, meaning that the sensing elements continue to integrate during the readout operation. Intuitively it is evident that smearing of the image will occur unless the image sensing, or integration, function is separated somehow from the readout operation. One obvious means for achieving this is to use an optical shutter. Another is to illuminate the subject being viewed only during the integration period so that readout occurs in the dark. Another way of effecting readout occurs in the dark is to transfer the integrated information to a parallel storage line or array which is maintained in the dark and to effect readout while the sensing line or array integrates the next frame. Since the transfer time for the parallel shift operation is a small fraction of the readout time (the reciprocal of the number of line elements) smearing can effectively be eliminated. Devices based upon this recognition are described fully in U.S. Pat. application Ser. No. 124,735, filed Mar. 16, 1971 by M. F. Tompsett.

Yet another solution to the smearing problem takes advantage of the three dimensional charge transfer concept described earlier. The image is sensed with a line or array situated on one side of the device, then the recorded information is shifted to the opposite side of the device where it can be read out in the dark. This device is more fully described in U.S. Pat. application, Ser. No. 211,514, filed Dec. 23, 1971, by G. E. Smith and F. Vratny.

Figure 15:
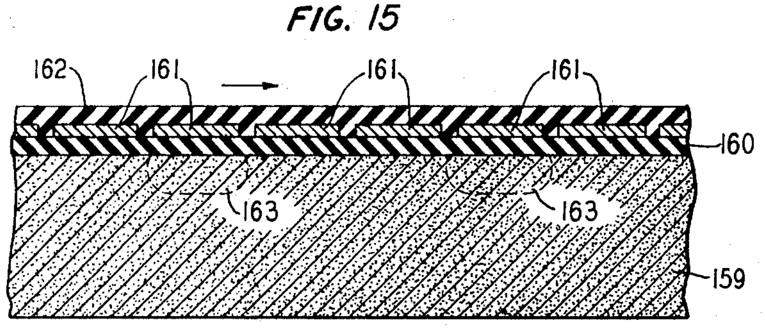
FIG. 15 is a front sectional view of an alternative means for transferring charge that does not require wire connections to each transfer stage.

It is evident at this point that the essential objective of the charge translation scheme is to create a traveling potential well along the surface of the semiconductor. The use of electrical connections for this purpose has been described above. However other means of producing a traveling potential will offer distinct advantages. For example, the field accompanying an acoustic wave traveling in a piezoelectric medium is an attractive alternative. An embodiment based upon this principle is shown in FIG. 15. This figure shows a portion of the shift register of FIG. 2 with semicondcutor 159, insulator 160, and a series of metal contacts 161 corresponding essentially to similar elements in FIG. 2. A piezoelectric layer 162 is deposited over the metal contacts. This layer may be composed of a suitable piezoelectric material such as zinc oxide or cadmium sulfide, and may be evaporated or sputtered onto the device. A piezoelectric transducer (not shown) or other suitable means creates an ultrasonic wave which propagates through the layer 162 parallel to the surface of the device. The electric field accompanying the elastic deformation in the piezoelectric layer sequentially biases the electrodes 161 and creates potential wells 163 that travel along the surface of semiconductor 159. This is the same result that is achieved stepwise in FIG. 2.

Figure 16:
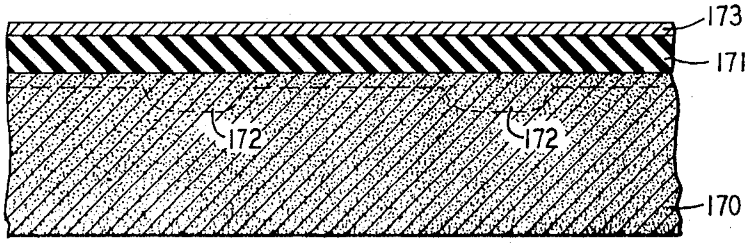
FIG. 16 is a front sectional view illustrating a structure alternative to that of FIG. 15.

By extending the traveling field approach of FIG. 15 the discrete electrodes can be eliminated. For example, FIG. 16 shows a device very simple in structure. The semiconductor 170 is coated directly with a piezoelectric layer 171. In this device the field that propagated in associated with the elastic wave in medium 171 (initiated by appropriate ultrasonic generator not shown) is used to form traveling potential wells 172. A metal electrode 173 may be used to create a uniform depletion layer over the entire charge translating surface for the purpose described in connection with FIG. 4.

While the several embodiments described above are set forth in terms of structure, a brief discussion of material considerations is warranted. A very distinct advantage of the novel device concept herein disclosed is that materials suitable for each of the devices described are available and well understood. For example, these devices can be fabricated of silicon and silicon dioxide according to well-established technology. Combinations of insulators such as $SiO_2$ - $Si_3N_4$, $SiO_2$-$Al_2O_3$, etc. are especially useful in certain circumstances as the insulating layer. Known electrode materials are gold, aluminum and doped-silicon. A useful structure for the device of FIG. 2 could employ 10 ohm/cm. n-type silicon as the base layer 20 and 1,000 Angstroms to 2,000 Angstroms of thermally grown $SiO_2$ as the layer 21. The oxide which has given the best results so far is a dry oxide 1,200 Angstroms thick grown in oxygen at 1,100° C for 1 hour and annealed in a nitrogen atmosphere for 1 hour at 400° C. the flatband potential for this oxide is typically −5 V. and the surface state density is of the order of $10^{10}$ states/cm$^2$. Electrodes 22–24 may be gold in any typical thickness, e.g., 0.1 to a few microns. An appropriate charge generator is a p-region, having a boron concentration of $10^{18}$ atoms/cm.$^3$, driven at avalanche, i.e., a few volts. The detector may be a similar p-n junction. The creation and detection of minority carriers in semiconductors can be accomplished by well-known techniques.

The dimensions of the transfer array can vary widely. The spacing between electrodes depends upon the extent of the space charge region permitted. For example if the semiconductor is 10 ohm/cm. silicon and a voltage of 10 volts is used, the depletion region will extend approximately 5$\mu$. This would suggest an electrode spacing of the order of a few microns for the necessary overlap. The creation and detection of minority charge carriers in silicon are easily accomplished using known techniques. It should be understood, however, that the devices described herein are in no way limited to silicon and its associated technology although that is relied on by way of example.

In assessing the contribution made to the art by the foregoing device descriptions it may be useful to point out that devices made in accordance with the novel principles set forth will normally include a multiplicity of discrete storage sites. Recognizing that each storage site has three electrodes in a device with three phase drive, or two electrodes in a device with two phase drive, and that a useful device would presumably have at least two bits, then the minimum number of electrodes that would be disposed between the input stage and the detection stage would be four. As a practical matter this number would be significantly greater, for example 288 in a 96 bit device actually developed. However, these considerations are useful in pointing out the qualitative difference between this device configuration and gated MIS devices previously known. Even in efficiently integrated MIS arrays the signal is conventionally injected and removed from the semiconductor at each control element. The storage and transfer of electrical information carriers wholly within the storage medium according to the invention is a basically new approach to information handling.

Another approach to this form of information handling is described in U.S. Pat. No. 3,621,283, issued Nov. 16, 1971. The device described in connection with that approach gates free charge between adjacent diffused regions in a semiconductor. The gate overlies one of the diffused regions more than the other in order to impart directionality to the charge transfer. As a consequence, the semiconductor area below each gate electrode includes regions of both conductivity types.

By contrast, the charge coupled devices described here are characterized in that the semiconductor areas below the transfer electrodes are of a single conductivity type.

Various additional modifications and deviations will occur to those skilled in the art. All such variations which basically rely on the teachings through which the disclosure has advanced the art are properly considered within the scope of this invention.

What is claimed is:

1. In a charge transfer apparatus of the type for storage and serial transfer of charge carriers localized in a plurality of induced potential energy minima along a portion of a semiconductor charge storage medium by sequentially applying different potentials to successive portions of the surface of the medium through a plurality of electrodes, the invention characterized in that the charge storage medium is of a single conductivity type.

2. In a charge transfer apparatus of the type for storage and serial transfer of charge carriers localized in a plurality of induced potential energy minima along a portion of a semiconductor charge storage medium by sequentially applying different potentials to successive portions of the surface of the medium through a plurality of electrodes, the invention characterized in that the portion of the charge storage medium in which charges are stored and transferred and which directly underlies each electrode of said plurality of electrodes is of a single conductivity type.

3. The apparatus of claim 2 in which the charge storage medium is covered with an insulating layer and the plurality of electrodes are disposed on the insulating layer.

4. The apparatus of claim 3 in which the charge storage medium is silicon.

5. The apparatus of claim 3 in which the insulating layer comprises $SiO_2$.

6. The apparatus of claim 2 including means for exposing the device to light in order to form the charge carriers.

7. The apparatus of claim 6 in which charge carriers are formed simultaneously in a plurality of potential energy minima.

8. The apparatus of claim 2 further including a piezoelectric layer formed on one surface of the device with means for creating an acoustic wave in the layer so that an electrical field is created by the acoustic wave propagating in the piezoelectric layer.

9. The apparatus of claim 2 in which the portion of the charge storage medium in which charges are stored and transferred is a surface portion.

10. A charge coupled device comprising a charge storage medium, a charge input region at a first location in the charge storage medium at which charge carriers representing signal information can be introduced into the medium, a charge detection region at a second location in the charge storage medium at which charge carriers can be detected and a charge storage and transfer channel interconnecting the input region and the detection region, the charge storage and transfer channel consisting of a single conductivity type semiconductor, an insulating layer overlying the charge storage medium, and at least four discrete electrodes disposed on the insulating layer overlying the charge storage and transfer channel.

11. The device of claim 10 in which the charge input region for introducing charge carriers comprises a p-n junction.

12. The device of claim 10 in which the charge input region for introducing charge carriers comprises a metal-insulator-semiconductor device.

13. A semiconductive device comprising a semiconductive charge storage layer having a major surface, an insulating layer overlying said major surface, an electrode assembly on the insulating layer including a plurality of electrodes, means for forming a succession of spaced storage sites for the storage of charge carriers in the charge storage layer and for transferring stored charge carriers between successive sites in a predetermined direction, and wherein the charge storage and transfer layer consists of a material that is of a single conductivity type.

14. A semiconductive device comprising a semiconductive charge layer having a major surface, an insulating layer overlying said major surface, an electrode assembly on the insulating layer including a plurality of electrodes, means for forming a succession of spaced storage sites for the storage of charge carriers in the charge storage layer and for transferring stored charge carriers between successive sites in a predetermined direction, and wherein the portion of the charge storage and transfer layer that directly underlies each electrode is of a single conductivity type.

15. The device of claim 14 further including three separate conductors each connected to a different one of every third electrode of the plurality of electrodes.

16. The device of claim 15 in which the electrodes are shaped and placed so that the three separate conductors extend parallel to one another.

17. The device of claim 14 in which the means for forming a succession of spaced storage sites includes circuit means connected to the plurality of electrodes for applying pulses sequentially to each of the plurality of electrodes.

18. The device of claim 17 in which the pulses are square wave pulses.

19. The device of claim 17 in which the pulses are sine wave pulses.

20. The device of claim 17 in which the pulses are sawtooth pulses.

21. The device of claim 14 including electrical circuit means for biasing all of the electrodes at a uniform potential so that the surface of the semiconductive charge storage layer can be maintained depleted during operation of the device.

22. The device of claim 14 in which the space between each of the plurality of electrodes is approximately 3 microns.

23. The device of claim 14 in which the length of each of the plurality of electrodes as measured in the predetermined direction is comparable to or less than the thickness of the insulating layer.

24. The device of claim 14 including charge detection means at a charge detection region for detecting the presence, absence or amount of charge in the charge detection region.

25. The device of claim 24 in which the charge detection means comprises a metal-insulator-semiconductor device.

26. The device of claim 25 in which the metal-insulator-semiconductor device is connected to the gate of a field-effect transistor for measuring the capacitance of the metal-insulator-semiconductor device.

27. The device of claim 24 in which the charge detection means is coupled to a charge input means to recirculate charge.

28. The device of claim 24 including means for regenerating the charge detected by the charge detection means.

29. The device of claim 24 in which the charge detection means comprises a capacitive bridge circuit electrically coupled to the charge detection region for measuring changes in the capacitance of the charge detection region.

30. The device of claim 24 in which the charge detection means comprises two adjacent electrodes overlying the charge detection region with means for connecting an alternating current to the electrodes and means for measuring the power dissipation of the alternating current.

31. A multichannel shift register comprising a body of semiconductor material of a uniform conductivity type, a thin insulating layer covering at least a portion of one surface of said body, a plurality of series of metal electrodes formed on the insulating layer, each series constituting one channel of the shift register and defining a path along the subjacent surface of the semiconductor body, the path having a single conductivity type, means for establishing charge carriers in the body of the semiconductor beneath a first electrode of each series, electrical circuit means interconnecting the electrodes to sequentially vary the bias on each series of electrodes and propagate a potential well stepwise along said path below the electrodes thereby translating the charge carriers through the semiconductor along said path, and detector means in each series associated with an electrode removed in the series from said first electrode for detecting the presence or absence of charge carriers in the semiconductor below its associated electrode.

32. A multichannel shift register comprising a semiconductor body, a thin insulating layer covering at least a portion of one surface of said body, an array of metal electrodes formed on the insulating layer, a plurality of input electrodes arranged along one side of the array, a plurality of output electrodes arranged along the opposite side of the array and a series of groups of transfer electrodes extending between each input electrode and an output electrode, each series comprising with its associated input and output electrodes one channel of the shift register, the spacing between electrodes in each series being less than the spacing between electrodes in adjacent series, each group of electrodes comprising a first electrode, a second electrode, and a third electrode in sequence, first, second and third conductors, respectively connected to every first, second and third electrodes, and electrical circuit means interconnected to vary sequentially the bias on the first, second and third conductors with electrical pulses which overlap, the shift register characterized in that the regions of the semiconductor body directly beneath each transfer electrode are of a single conductivity type.

* * * * *